May 5, 1942.   J. W. BRISTER   2,282,114
MICROMETER CALIPER
Filed Feb. 7, 1941
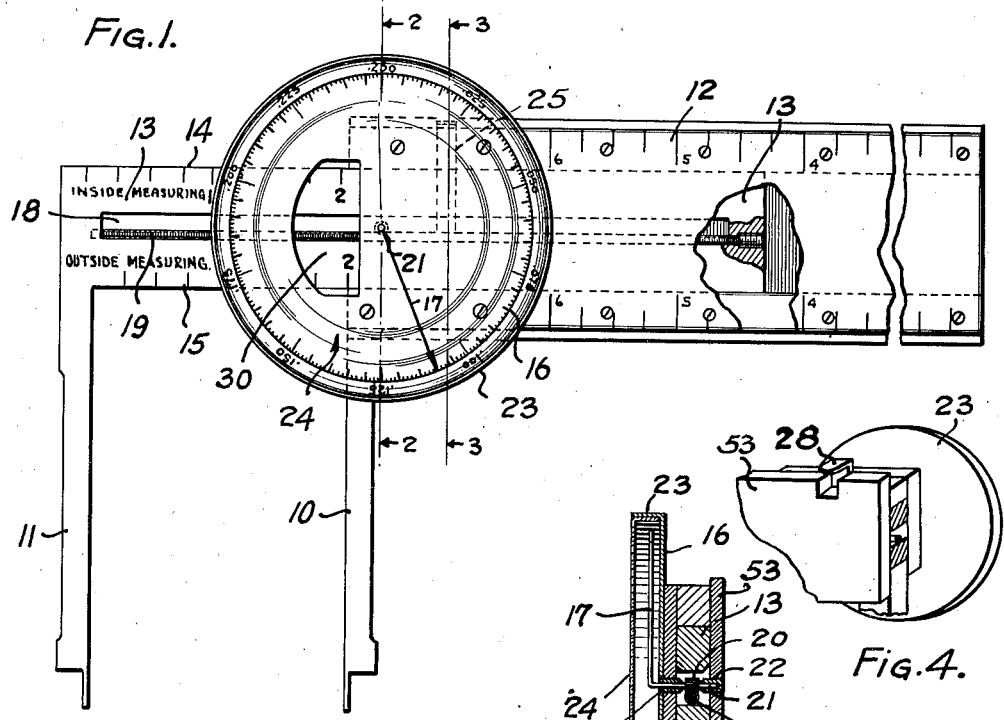
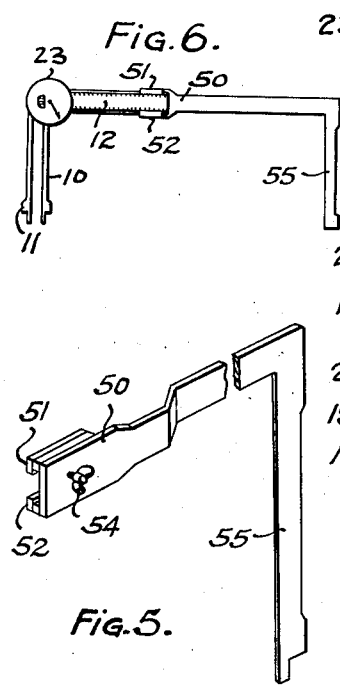
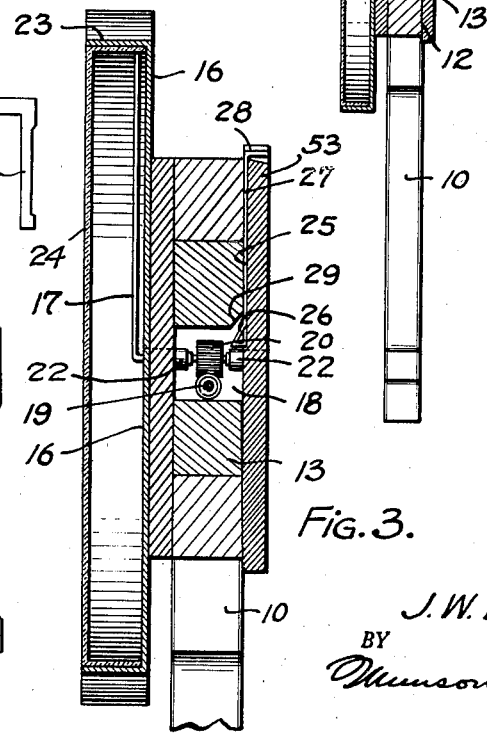
INVENTOR.
J. W. BRISTER
BY
Munson H. Lane
ATTORNEY.

Patented May 5, 1942

2,282,114

UNITED STATES PATENT OFFICE 2,282,114

MICROMETER CALIPERS

Jess Willard Brister, Alexandria, La.

Application February 7, 1941, Serial No. 377,899

2 Claims. (Cl. 33—147)

The invention relates to micrometer calipers preferably of the beam type wherein a pair of measuring jaws are carried by a frame member and beam respectively, the beam or scale being slidably mounted in the frame or housing.

According to my invention an improved micrometer for measuring small fractions is provided consisting of relatively movable indicator and dial members, one being fixed with reference to the frame and the other rotatable with reference thereto, rotation being imparted by the sliding movement of the beam or scale with reference to the housing member incident to the adjustment of the measuring jaws to an object to be measured.

One of the objects of the invention is to provide a simple and inexpensive device of the above character which will be useful for numerous purposes.

The invention will be more readily understood by reference to the accompanying drawing in which is set forth by way of illustration a practical embodiment of the invention.

In the drawing:

Fig. 1 is a side elevation of a pair of micrometer calipers embodying the present invention.

Fig. 2 is a sectional view on line 2—2 of Fig. 1.

Fig. 3 is a sectional view on an enlarged scale taken on line 3—3 of Fig. 1.

Fig. 4 is a detail plan view showing the finger piece of the brake member in raised position.

Fig. 5 is a perspective view on a reduced scale of an extension attachment to increase the effective range of the device.

Fig. 6 is a diagrammatic view illustrating the extension attachment applied to the frame member of the calipers.

Referring to the drawing, the reference numerals 10 and 11 indicate a pair of jaws of any desired construction suitable for inside or outside measurement and adapted to be manually moved toward or away from each other to perform the measuring operation in the well-known manner.

As shown the jaw 10 extends at right angles to a frame or housing member 12 having a longitudinal recess within which a beam or scale member 13, carrying the jaw 11, is adapted to slide as the jaws are moved toward or away from each other in the calipering operation. The members 12 and 13 may be of any suitable material preferably metal as stainless steel. The front and rear faces of the frame or housing may be provided with any desired useful data such as fractional equivalents in the English and decimal systems and may be provided with scales on the upper or lower edge or both so as to serve as a rule or straight edge if desired.

The beam, scale or slide member 13 may be provided with upper and lower scales 14 and 15 marked in inches or fractions thereof or in the decimal system.

To indicate small fractions an improved micrometer is employed comprising a stationary dial member 16 secured to the frame or housing 12 near one end thereof and a pointer or indicator 17 connected therewith and rotatable as the beam or scale member 13 slides within the housing during a measuring operation.

Suitable means for rotating the pointer with reference to the dial may be provided. As shown a slot 18 extends longitudinally of the scale or beam member and within such slot is mounted a screw-threaded rod 19 fixed at its ends in the beam or scale member. The rod 19 is not rotatable but fixed. A worm pinion 20 is adapted to coact with the screw-threaded rod. This pinion is fixed upon an axis 21 the ends of which are rotatably mounted in antifriction bearing members 22 in the front and rear faces of the housing member. The pointer or indicator 17 forms an extension of the axis 21 and on rotation of the pinion 20 the pointer is rotated about the dial 16. The dial 16 is secured in any suitable manner to the front face of the frame or housing member 12 and is provided with suitable indicia indicating the desired fractions. As shown the dial is provided with a rim 23 within which fits a similar rim of a Celluloid or other transparent cover 24 which is adapted to protect the pointer and bearings from dust.

In order to protect the pinion 20 from injury a combined stop and brake member 25, preferably formed from sheet metal, is provided which includes a wedge-shaped portion 26 normally extending into the slot 18 in the slide member and adapted to be engaged by the end portion of the slide should the calipers be separated to their maximum extent. In such case the member 26 serves as a stop. The wedge-shaped member 26 is connected by means of a vertical portion 27 with a suitable finger piece 28 projecting outside of the frame member. By means of this finger piece the wedge-shaped member 26 may be lifted so that it will frictionally engage a beveled portion 29 formed on one lower edge of the upper bar of the beam or scale member. In this manner the beam or scale may be held in any desired adjusted position.

The operation of the device will be evident from the foregoing description. The jaws 10 and 11 may be used for either inside or outside measurement and in adjusting the same to fit the desired object to be measured the beam or scale member 13 is moved with reference to the frame or housing 12 thereby moving the screw-threaded rod 19 lengthwise with consequent rotation of the pinion 20 and pointer 17. Large measurements may be read directly on the scale or beam member 13 while the smaller measurements are read upon the dial 16. A portion of the dial is preferably cut away at 30 so as to permit reading the scales 14 and 15 on the slide member.

The rotary pinion 20 is of such small diameter in reference to the comparatively large dial 16 that a very small rotation of the pinion is sufficient to cause a considerable movement of the tip of the pointer 17 relative to the dial.

The separation of the jaws 10 and 11 is limited by the stop member 26 and when it is desired to temporarily secure the parts in adjusted position the brake member may be applied by raising the finger piece 28, thus bringing the inclined edge of the wedge-shaped member 26 into engagement with the correspondingly inclined portion 29 of the slide.

When it is desired to increase the effective range of the calipers an extension device such as is shown in Fig. 5 may be adjustably applied to the frame member 12 of the calipers as indicated diagrammatically in Fig. 6. This attachment can be made cheaper than a larger micrometer, and is especially useful for a lathe operator, in measuring a truck or car axle brake drum, for instance, after he has turned it. The attachment is installed only when needed and may be slipped on and held firmly by means of a set screw, in any suitable adjusted position on the frame member, as indicated by the graduation marks formed thereon.

As shown the extension device comprises a horizontal member 50 provided with holding flanges 51 and 52 adapted to engage the inner face of the rear plate 53 of the frame. A set screw 54 serves to secure the attachment in any desired position. A member 55 extending at right angles to the member 50 serves as a measuring jaw and is adapted to cooperate with the slidable jaw 11 of the calipers.

The invention has been described in detail for the purpose of illustration but it will be obvious that numerous modifications and variations may be resorted to without departing from the spirit of the invention.

I claim:

1. In a measuring device of the character described, a frame member, a beam member slidingly mounted therein having a scale, measuring jaws carried by the beam and frame member respectively and adapted to be manually moved to engage an object to be measured, said beam having a longitudinal beveled portion, and means for retaining said beam in any desired adjusted position, comprising a brake member having an inclined face adapted to engage the beveled portion of said beam, and means for reciprocating said brake member into and out of engagement with the beveled portion of said beam, said beam being longitudinally slotted intermediate its ends, and the beveled portion being formed at one of the edges of the slot, a dial carried by said housing member, a screw and pinion mounted within the slotted portion of the scale member, and an indicator coacting with said dial and rotatable with said pinion.

2. A distance measuring device as set forth in claim 1 wherein the measuring jaws are provided with relative long narrow tips extending from the remainder of the jaw adapted to measure an automobile crankshaft or the like at its main bearing journal without removing the crankshaft from the motor.

JESS WILLARD BRISTER.